United States Patent Office 2,955,045
Patented Oct. 4, 1960

2,955,045

PACKAGING CHEESE

Frank O. Coffey and Lewis J. Hayhurst, Glenview, and George Howard Kraft, Wilmette, Ill., assignors to National Dairy Products Corporation, New York, N.Y., a corporation of Delaware No Drawing. Filed Nov. 18, 1957, Ser. No. 696,964

3 Claims. (Cl. 99—178)

The present invention relates to the packaging of cheese and, more particularly, it relates to a method of packaging pieces or units of cheese in substantially gas-proof and moisture-proof wrappers.

The process of this invention is applicable to cheeses which do not develop a substantial amount of gas in their shelf life. That is to say, the invention can be applied to any cheeses which do not develop a substantial amount of gas over a substantial period of time, i.e., of the order of three months to one year. In this connection, the process of the invention is applicable to cured units of American, Swiss, brick, and other types of natural cheese, as well as to the various varieties of process cheese which have been preformed or which are in the form of assembled units of slices.

For approximately the past twenty years cheese has been packaged in flexible wrappers. This has been accomplished in many ways. For example, the procedure involved in the Davis patent, No. 2,361,749 (1944), employs a limp sheet of Pliofilm (rubber hydrochloride) which is wrapped with overlapping seams around the unit to be packaged and which is maintained in contact with the surface of the block under mechanical pressure. The overlapping seams are not sealed against gas passage and they allegedly provide a one-way valve which permits $CO_2$ and other gases formed during the curing of the cheese to escape from the package. This valve action is supposed to prevent the entrance of oxygen into the package. Similarly, the patent to Abrams et al., No. 2,077,300, and the patent to Abrams et al., No. 2,266,700, contemplate the packaging of cheese in wrappers made of a film which is alleged to provide a barrier which will permit any gases formed in the curing of the cheese to escape through the film but which at the same time will prevent oxygen to diffuse through to the cheese. Also, various schemes have been evolved to effect the packaging of cheese in a vacuum to effect the removal of air.

A recently issued patent to Ingle and Nawrocki, No. 2,753,268, also discloses a method for packaging cheese, which method comprises placing a body of cheese in a flexible wrapper. In accordance with the disclosed method, the cheese is flushed within the wrapper with carbon dioxide gas, which gas is then substantially removed by drawing a vacuum on the wrapper and cheese. The package is sealed while under vacuum and the package, upon standing, develops a greater degree of vacuum by absorption of the carbon dioxide by the cheese.

However, despite the multitude of prior methods for packaging cheese, it has been extremely difficult to obtain a package in which the cheese could be satisfactorily held in a mold free and attractive condition for commercial purposes for the desired periods of time. This has resulted from various circumstances. Mold spores are everywhere and it is impractical to exclude them from the surface of cheese being packed on a commercial basis, although, of course, they can be minimized by sterilization of the air in the area in which the cheese is being packaged. Also, since mold needs oxygen to flourish, the obvious means to control mold is to seal the surface of the cheese from contact with oxygen. This is what Davis, Abrams, and others have tried to do but if there is even a small leak in the package so that the oxygen volume can build up the mold grows flourishingly on the moist surface of the cheese and the cheese becomes unsaleable to a consumer in a surprisingly short time. Consequently, these prior methods have been something less than what is desired.

Various chemical antimycotic agents have been employed to prevent or inhibit the growth of mold. However, such antimycotic agents are, in some instances, undesirable.

The other difficulty which arises in packaging cheese, i.e. maintaining an attractive package, occurs when various inert gases are used in the establishment of proper packaging conditions. In this connection, unless such gases are used in a particular manner, the wrapper may not maintain the desired relation to the cheese. In the packaging of Swiss cheese it is considered desirable for the wrapper to remain substantially flat upon the cheese and not be pulled into the openings or eyes of the cheese. On the other hand, under certain conditions, it may be desirable for the wrapper to snugly fit around the cheese. Also, in the packaging of cheeses, it is desirable that the wrapper should not puff out around the cheese.

Despite the various difficulties which have been encountered in the past, it has been possible to package cheese in such a manner that the cheese will at least keep for the bare period of time which is required for commercial distribution or sale. This may be obtaining a good seal on the package and by taking care to force the residual air from the package. Although under the optimum conditions these packages may be satisfactory, there are times when the seal is not quite perfect or when the air is not properly excluded from the package and, consequently, the packaged cheese molds. Of course, it is impossible to determine from a visual examination of the packages made by the known packaging methods whether or not the seal is adequate or whether or not the air has been excluded properly from the package so that even though the distributor takes reasonable precautions he may find that after several weeks the packages will be moldy and he will take a serious loss.

Accordingly, the principal object of the present invention is to provide an improved method for packaging cheeses of the type described above which will permit the cheeses to be held for the necessary period for distribution. An additional object of the invention is to provide an improved method for packaging cheese so as to establish a desired and predetermined relation between the wrapper nad the packaged cheese during distribution and storage. A further object of the invention is to provide a method of packaging cheese which may provide a visual indication of the efficiency of the seal so that improperly sealed packages may be either resealed or may be disposed of first in a shorter period of time so as to avoid marketing losses.

These and other objects of the invention are accomplished by a process which involves wrapping the cheese in a substantially gas-proof and moisture-proof wrapper, introducing an innocuous, non-mold-growth-sustaining, gaseous media which includes a gas which is readily soluble in or absorbable by the cheese and a gas which is substantially insoluble and will not be absorbed by the cheese, sealing the package to provide an air tight package, and holding the sealed package under conditions which are not deleterious to cheese.

If the package is sealed and gas which is soluble in the cheese is used in proper ratio to insoluble gas, the soluble gas will become dissolved or absorbed and will draw down or collapse the wrapper around the cheese thereby indicating that the package is properly sealed. In the event that such package is not properly sealed, the absorption of the gas by the cheese will cause air to enter the package to replace the gas being absorbed and the wrapper will not become drawn down around the cheese. Such wrappers as do not contract around the cheese after a predetermined period may then be removed and the cheese repackaged or, in the alternative, the cheese may be disposed of before mold can develop.

One innocuous gas which is soluble in the cheese and which may be used in the practice of the invention is carbon dioxide. Carbon dioxide is soluble in both the milk fat and the moisture at cheese storage temperatures, it is relatively inexpensive, and it does not support mold growth; consequently, it is a preferred soluble gas for use in the invention. While other soluble gases than carbon dioxide may be used, the only practical gas presently known for food purposes is carbon dioxide. Likewise, while other insoluble gases than nitrogen may be employed, nitrogen is the most readily available and most satisfactory gas for foods.

The carbon dioxide, of course, is soluble in the cheese at varying rates depending somewhat on the shape and surface area of the cheese block being treated. Since the carbon dioxide when dissolved will be dispersed throughout the cheese, a unit which presents a thin section will absorb the gas more rapidly than that which presents a thick section. For example, a ½ pound unit measuring 1 inch by 3⅝ inches by 3⅝ inches will absorb the gas much slower than the same weight of unit which measures ½ inch by 3⅝ inches by 7¼ inches.

Since this invention primarily relates to cheese, temperature does not appear to have a significant effect upon the invention. In this connection, cheese is kept and handled at temperatures between about 32° F. and about 65° F. Temperatures lower than about 32° F. result in deterioration of the product, whereas at temperatures above about 65° F., "oiling off" of the cheese occurs. Our experiments to date indicate that within this temperature range, temperature is not an important factor.

It has now been found that the rate and degree of absorption of the soluble gas into the variety or type of cheese is, in part, related to the amount of soluble gas which is present in the cheese. As is well known, natural cheeses contain a certain amount of carbon dioxide and the amount of contained carbon dioxide is a function of the variety or type of cheese and the time elapsed between cutting and packaging of the cheese, as well as the physical shape, as above-indicated. In this connection, freshly cut cheese contains more carbon dioxide than does cheese which has been standing at room conditions and a thin cut will lose its gas more rapidly than a thick cut. Furthermore, Swiss cheese tends to develop a substantially greater amount of carbon dioxide during curing than do other natural cheeses, as for example, Cheddar cheese, and consequently, Swiss cheese normally has more solubilized carbon dioxide. The age of the cheese before cutting is also a factor in the degree of carbon dioxide which is in the cheese. Temperature is a further factor in determining the amount of carbon dioxide which is in the cheese at any given time after cutting.

We have discovered that in order to provide a package of cheese wherein the wrapper bears the desired relation to the cheese, a particular ratio between the soluble gas at the time of wrapping and the insoluble gas must be established in the package. As is to be expected from the foregoing, this ratio of gases is a function of the above mentioned factors including the age of the cheese, the variety or type of the cheese, the time of packaging of the cheese after cutting, and the amount of fat and moisture in the cheese. Through our experiments, we have found that Cheddar cheese contains about the lowest amount of dissolved carbon dioxide whereas Swiss cheese contains about the highest amount of carbon dioxide in the cheese. Intermediate amounts of carbon dioxide are in the cheese in the cases of washed curd and brick cheeses.

Of course, process cheese has only a very small amount of carbon dioxide in the cheese because of the conditions to which the cheese is subjected in its manufacture. In this connection, in the manufacture of process cheese, the cheese is heated to temperatures in excess of about 140° F. to melt the cheese, and the cheese is blended with emulsifier, whereupon the cheese is packaged. It will be readily seen that such conditions will result in the volatilization of carbon dioxide so that the resulting cheese has only a very small amount of carbon dioxide in the cheese.

We have found that if the surrounding gas comprises carbon dioxide, exclusively, and if the wrapper is in close proximity to the cheese and is gas impermeable, the wrapper will be drawn down tightly onto the cheese in all cases. As before indicated, this is not too desirable in the case of various cheese packages.

If puffing of the wrapper is to be avoided and the wrapper is not to be tightly pulled around the cheese, the relative amount of carbon dioxide in the gas in the wrapper surrounding the cheese should be higher with cheeses having higher amounts of carbon dioxide in the cheese. Thus, with Swiss cheese, the surrounding gas should contain a substantial amount of carbon dioxide but with Cheddar cheese, the surrounding gas may contain lesser amounts of carbon dioxide. In this connection, with normal cutting and packaging procedures, the gas used for packaging Swiss cheese should comprise between about 50 and about 80 percent of carbon dioxide gas, the remaining gas being nitrogen. In the case of Cheddar cheese, we have found that the packaging gas should comprise between about 25 and about 70 percent of carbon dioxide gas, the remaining gas again being nitrogen. The experience with brick cheese indicates a gas mixture of from about 30 to about 70 percent of carbon dioxide with the remainder being nitrogen whereas in the case of washed curd cheese the amount of carbon dioxide in the packaging gas should be between about 40 percent and about 70 percent. In the case of process cheese, any amount of carbon dioxide in the packaging gas will cause the wrapper to draw around the cheese. In other words, the presence of any carbon dioxide in the surrounding gas results in absorption of the carbon dioxide.

Various films may be employed in wrapping the cheese in accordance with the process of the invention but the film which is employed should be impermeable to carbon dioxide, nitrogen and oxygen. Such films as Mylar (a polyester film of polyethylene terephthalate resin), polyethylene, Pliofilm (rubber hydrochloride), and vinyl are unsatisfactory because of their high gas transfer rates. In accordance with our process, such films as Saran (a poly vinylidine chloride), Vinylite (poly vinyl acetate, poly vinyl chloride, or copolymer thereof), or various laminated products such as Saran laminated to a film of polyethylene, etc. may be used. The packages may be sealed by heat sealing or by electronic means, depending upon the properties of the wrapper being employed.

The process of this invention makes possible better seals than are ordinarily obtained since it is not necessary to draw the wrapper tightly against the cheese before sealing and the sealing mechanism may be so designed as to perform efficiently without requiring extensive precautions as to the volume of free gas left in the package, since this volume is readily removed by the gas procedure of this invention. It will also be seen that the process of this invention makes possible the establishment of any desired relation between the cheese and the surrounding wrapping material. The wrapper may be drawn around the cheese or a loose wrapper may be provided.

The air in the package may be removed after the package is partially sealed by vacuum, and the soluble gas or the mixture of soluble gas with insoluble gas may be injected into the package as the vacuum is broken, after which the package may be sealed. This may be accomplished on various types of known apparatus.

Another manner of accomplishing the objects of the invention is to sweep out the contained oxygen in the package by a stream of the soluble gas or the mixture of soluble and insoluble gases, after which the package may be sealed.

The use of particular gas mixtures for varying types of cheeses in order to establish a particular relation between the packaging material and the cheese is believed to be altogether new in cheese packaging. A complete explanation for this phenomenon is not altogether understood. However, it appears that the concentration of the gas in the gaseous phase in the package bears a constant relation to the concentration of gas in the cheese. Accordingly, if there is a relatively high concentration of gas in the cheese, a high concentration of the corresponding gas must be present in the surrounding gaseous atmosphere in the package to minimize transfer of gas out of the cheese. Conversely, if there is a low concentration of a particular gas in the cheese, a low concentration of this gas must be present in the gaseous phase surrounding the cheese to minimize transfer of gas into the cheese. Of course, we are referring here to soluble gas, i.e., carbon dioxide, and not to the insoluble gas, i.e., nitrogen.

If there is a high concentration of gas in the cheese and a low concentration of the soluble gas, i.e., carbon dioxide in the gaseous atmosphere surrounding the cheese, the soluble gas in the cheese will tend to exude or evaporate from the cheese into the surrounding gaseous atmosphere. On the other hand, if the concentration of soluble gas in the surrounding gaseous atmosphere greatly exceeds the concentration of gas in the cheese, the soluble gas will tend to dissolve into the cheese to raise the concentration therein. Whether the soluble gas is going from the surrounding gaseous atmosphere or coming from the cheese, will determine the effect upon the wrapper. In this connection, if the soluble gas is going into the cheese, the wrapper will draw more tightly around the cheese, whereas if the soluble gas is coming out of the cheese into the surrounding gaseous atmosphere, the package will tend to puff, i.e., more gas will be in the gaseous atmosphere.

In order to inhibit mold growth, the level of oxygen in the package should be reduced to a point below that which is required to sustain such growth. This may be done by using a vacuum before providing the packaging gas or may be done by flushing the packages so as to dilute or flush out any oxygen which is present. The minimum amount of oxygen which may be present in the various packages to inhibit mold growth varies with different types of cheese. In this connection, some cheeses utilize oxygen from the surrounding atmosphere and may utilize the oxygen in a time which is less than that required to sustain a substantial amount of mold growth.

The following are specific examples of our improved process.

*Example I*

A block of sliced (⅛ inch slices) pasteurized process cheese in the form of a rectangular unit measuring approximately 1 inch by 3⅝ inches by 3⅝ inches and weighing approximately ½ pound is wrapped in a layer of $K_2O_2$ wrapping material which is a laminated wrapping material. The wrapping material comprises one layer of Saran to which is combined polyethylene which is heat sealable. One end seal and a longitudinal seal are effected by heat sealing bars which soften the polyethylene thereby partially sealing the package. The partially sealed package is then subjected to a vacuum of about 27 inches of mercury in a vacuum chamber to remove air from the package, the volume of free or excess space in the package being such that after the second end seal is effected, the difference between the volume of the cheese and the capacity of the package is 55 cc. (this amount of cheese can absorb about 70 cc. of carbon dioxide). The vacuum is broken with a mixture of carbon dioxide gas (70 percent) and nitrogen (30 percent) and the second end seal is effected by heat sealing bars. The package, after sealing, is loose in appearance and does not cling to the cheese. This package is placed in a cooler at 45° F. for 24 hours and upon examination at that time the wrapper is found to be drawn around the cheese. In the event that an improper seal is made air is drawn in through the fault in the seal and the wrapper will not be so drawn about the cheese.

*Example II*

A block of cured natural Swiss cheese in the form of a rectangular unit measuring approximately 1 inch by 3⅝ inches by 3⅝ inches and weighting approximately ½ pound is wrapped within one hour after cutting in a layer of Loxon wrapping material which is a laminated wrapping material. The wrapping material comprises a layer of Saran (polyvinylidine chloride) laminated to a layer of polyethylene. The polyethylene layer is heat sealable. One end seal and a longitudinal seal are effected by heat sealing bars which soften the polyethylene coating thereby partially sealing the package.

The partially sealed package is then flushed with a stream of gas comprising a mixture of carbon dioxide and nitrogen to remove air from the package. The volume of free or excess space around the cheese unit in the package is such that after the second end seal is effected it will be about 45 cc. The volume of free space in the cheese itself due to the eyes or holes is about 14 to 15 percent by volume so that the free volume in the cheese is about 32 cc. Therefore, if the wrapper is not to be drawn down into the exposed eyes of the cheese the gas should include about 32 parts by volume of nitrogen for each 45 parts by volume of carbon dioxide. Of course, if a very light shrinkage is desired a greater proportion of carbon dioxide may be employed. After the package has been thoroughly flushed to minimize entrapped oxygen the second end seal is effected by the heat sealing bars. This package, after sealing, is loose in appearance and does not cling to the cheese. If larger amounts of nitrogen are used in the gas mixture, carbon dioxide may exude from the cheese, thereby causing the wrapper to puff.

*Example III*

A block of cured natural Cheddar cheese was cut from a large block in the form of a rectangular unit, the unit weighing approximately one-half pound. In less than one-half hour, the block of Cheddar cheese was loosely wrapped in a flexible wrapper comprising $K_2O_2$ which is a laminated wrapping material including a layer of Saran (polyvinylidine chloride) laminated to polyethylene. The package was flushed with a gas comprising about 50 percent carbon dioxide and about 50 percent nitrogen. After flushing, the package was sealed so that the gaseous atmosphere in the package comprised 50 percent nitrogen and 50 percent carbon dioxide.

The package was allowed to stand for several months and the wrapper did not puff up or draw down onto the cheese.

*Example IV*

A half pound of washed curd type Cheddar cheese was cut from a large block in a rectangular form. This cheese was also promptly loosely wrapped, i.e., within one-half hour, in $K_2O_2$, which is above described, and the package was flushed with a gas mixture comprising 50 percent carbon dioxide and 50 percent nitrogen. As in the case of the Cheddar cheese, the package did not draw down onto the cheese after standing for several months in storage.

*Example V*

A half pound rectangular block of brick cheese was cut from a large block and within one-half hour was wrapped in a $K_2O_2$ film. The package was flushed with a gas mixture comprising 35 percent carbon dioxide and 65 percent nitrogen. The package was sealed, and after six months the wrapper did not draw down on to the cheese and did not puff up from the cheese.

In the case of each of the foregoing cheeses, the cheese was promptly wrapped after cutting and it has been found that upon extended standing of the cheese prior to wrapping, lower amounts of carbon dioxide relative to the amounts of nitrogen are required. In other words, as the time between cutting and packaging increases, the percentage of carbon dioxide in the flushing gas should be reduced.

As before indicated, if it is desired that the wrapper be drawn into more direct contact with the cheese, larger percentages of carbon dioxide should be employed in the gas.

While the relative percentage of carbon dioxide to nitrogen varies with various types of cheese so as to prevent the wrapper from puffing up or pulling down around the cheese, the percent of each gas can be readily determined for each cheese to provide the desired results. The use of a particular gas mixture for various types of cheese, and particularly the use of such mixtures to provide desired packaging results, is believed to be wholly new.

This application is a continuation-in-part of our abandoned application Serial Number 461,916, filed October 12, 1954, and entitled "Packaging Cheese."

Various of the features of this invention are set forth in the following claims.

We claim:

1. The method of packaging a unit of natural cheese which is in condition to exude carbon dioxide gas, said method comprising the steps of wrapping and sealing the unit in a flexible film of moisture proof, substantially gas impervious material to provide a moisture tight package which is impermeable to gases, providing in the sealed unit a substantially inert gaseous atmosphere at about atmospheric pressure, said gaseous atmosphere consisting of carbon dioxide gas and nitrogen gas in such ratio as to prevent puffing of said wrapper and to limit collapsing of said wrapper around said unit, the ratio between said carbon dioxide gas and said nitrogen gas being adjusted to limit absorption of carbon dioxide by said cheese unit and to prevent exudation of carbon dioxide gas from said cheese unit, the percent carbon dioxide gas in said gaseous atmosphere being in the range from about 25 percent to about 80 percent so that the amount of carbon dioxide in said gaseous atmosphere is directly proportional to the amount of dissolved carbon dioxide in the cheese.

2. The method of packaging a unit of natural Swiss cheese which is in condition to exude carbon dioxide gas, said method comprising the steps of wrapping and sealing the unit in a flexible film of moisture proof, substantially gas impervious material to provide a moisture tight package which is impermeable to gases, providing in the sealed unit a substantially inert gaseous atmosphere at about atmospheric pressure, said gaseous atmosphere consisting of carbon dioxide gas and nitrogen gas in such ratio as to prevent puffing of said wrapper and to limit collapsing of said wrapper around said unit, the ratio between said carbon dioxide gas and said nitrogen gas being adjusted to limit absorption of carbon dioxide by said cheese unit and to prevent exudation of carbon dioxide gas from said cheese unit, the percent carbon dioxide gas in said gaseous atmosphere being in the range from about 50 percent to about 80 percent so that the amount of carbon dioxide in said gaseous atmosphere is directly proportional to the amount of dissolved carbon dioxide in the cheese.

3. The method of packaging a unit of natural Cheddar type cheese which is in condition to exude carbon dioxide gas, said method comprising the steps of wrapping and sealing the unit in a flexible film of moisture proof, substantially gas impervious material to provide a moisture tight package which is impermeable to gases, providing in the sealed unit a substantially inert gaseous atmosphere at about atmospheric pressure, said gaseous atmosphere consisting of carbon dioxide gas and nitrogen gas in such ratio as to prevent puffing of said wrapper and to limit collapsing of said wrapper around said unit, the ratio between said carbon dioxide gas and said nitrogen gas being adjusted to limit absorption of carbon dioxide by said cheese unit and to prevent exudation of carbon dioxide gas from said cheese unit, the percent carbon dioxide gas in said gaseous atmosphere being in the range from about 25 percent to about 70 percent so that the amount of carbon dioxide in said gaseous atmosphere is directly proportional to the amount of dissolved carbon dioxide in the cheese.

References Cited in the file of this patent

UNITED STATES PATENTS

| | | |
|---|---|---|
| 1,637,311 | Hawley | July 26, 1927 |
| 1,868,547 | Stevenson | July 26, 1932 |
| 1,915,489 | Gere | June 27, 1933 |
| 2,753,268 | Ingle et al. | July 3, 1956 |
| 2,865,767 | Gore | Dec. 23, 1958 |